United States Patent [19]

Grove et al.

[11] Patent Number: 4,534,575
[45] Date of Patent: Aug. 13, 1985

[54] VEHICLE SUSPENSION AND STEERAGE SYSTEM

[75] Inventors: John L. Grove, Greencaste; John L. Hockensmith; Allen B. Coffman, both of Chambersburg, all of Pa.

[73] Assignee: JLG Industries, Inc., McConnellsburg, Pa.

[21] Appl. No.: 434,733

[22] Filed: Oct. 18, 1982

[51] Int. Cl.³ .......................................... B60G 19/06
[52] U.S. Cl. .................................. 280/6.11; 180/41; 188/300; 280/95 R; 280/104
[58] Field of Search .................. 280/6.11, 6 R, 6 H, 280/95 R, 104, 111, 112 A; 180/41, 144, 148, 154, 160; 188/300, 312

[56] References Cited

U.S. PATENT DOCUMENTS

| | | | |
|---|---|---|---|
| 2,536,769 | 1/1951 | Rix et al. | 280/104 |
| 2,553,912 | 5/1951 | Gervais | 188/312 |
| 2,653,828 | 9/1953 | Alley | 280/104 |
| 2,902,100 | 9/1959 | Leliter | 180/41 |
| 3,001,798 | 9/1961 | Logan | 280/104 |
| 3,133,744 | 5/1964 | Weiertz | 280/6 H |
| 3,166,340 | 1/1965 | Rusconi | 280/104 |
| 3,175,709 | 3/1965 | Sibley | 280/6.11 |
| 3,207,254 | 9/1965 | DeVenel | 180/148 |
| 3,247,922 | 4/1966 | Hanson | 180/9.52 |
| 3,302,739 | 2/1967 | Beck et al. | 280/6.11 |
| 3,353,839 | 11/1967 | Pistone | 280/104 |
| 3,480,098 | 11/1969 | Ward | 180/41 |
| 3,792,748 | 2/1974 | Regier | 180/41 |
| 3,915,253 | 10/1975 | Ott et al. | 180/160 |

FOREIGN PATENT DOCUMENTS 634111 3/1950 United Kingdom ............... 280/104

Primary Examiner—Joseph F. Peters, Jr.
Assistant Examiner—Kenneth R. Rice

[57] ABSTRACT

A suspension and steerage system is disclosed for a wheel supported vehicle. A suspension arm assembly of parallelogram configuration is pivotally attached to one side of the main frame and freely supports a wheel spindle. The piston rod of a hydraulic motor interconnects opposite wheels, and a lever structure is provided which, in response to pivotal oscillation of one wheel, axially activates the piston rod to transfer reactive forces to the opposite side of the main frame, and serves to level the plane of the main frame. The hydraulic motor can further be equallized to lock out further movement of the wheels, thereby stabilizing the vehicle in a static condition.

3 Claims, 8 Drawing Figures

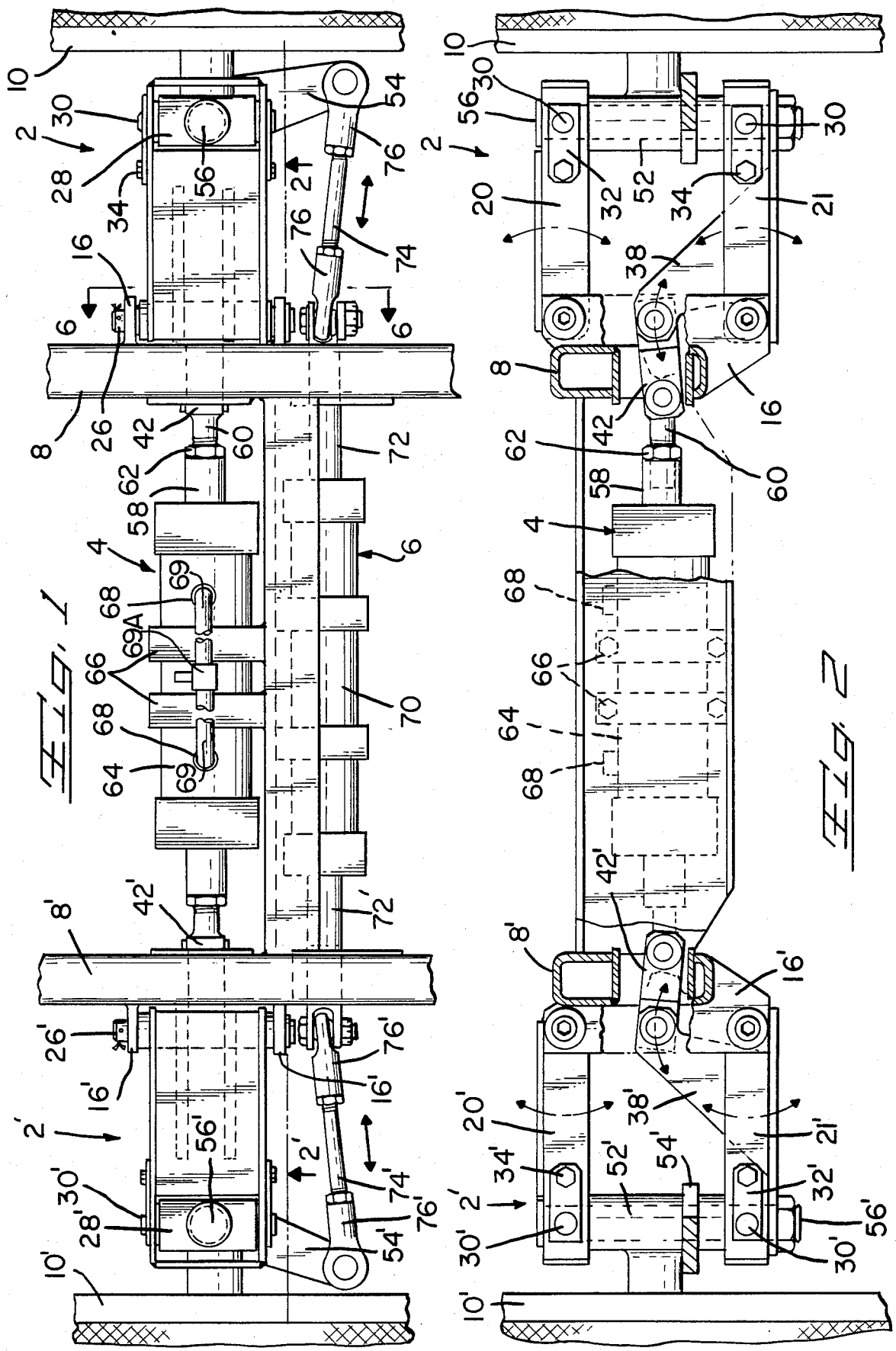

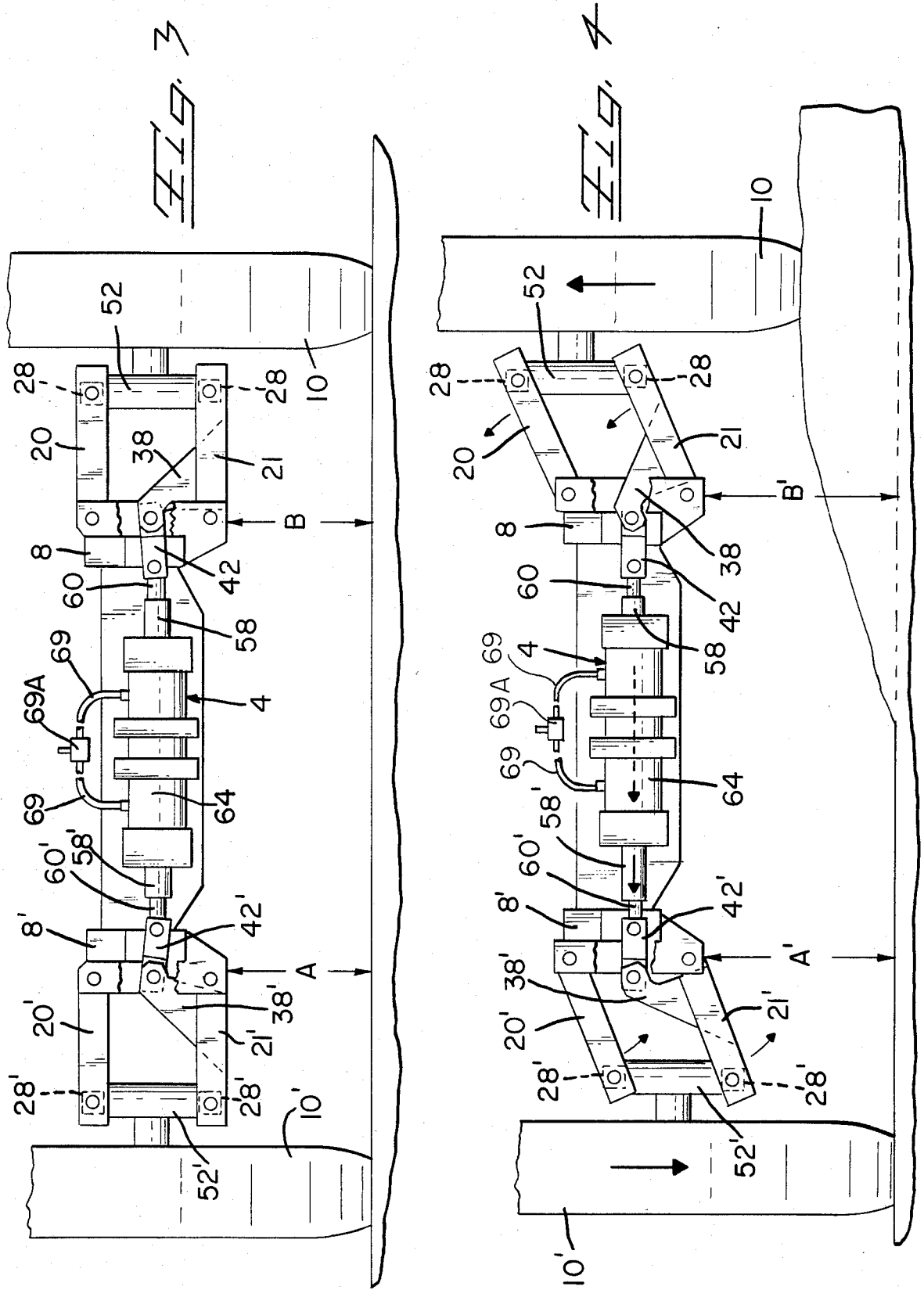

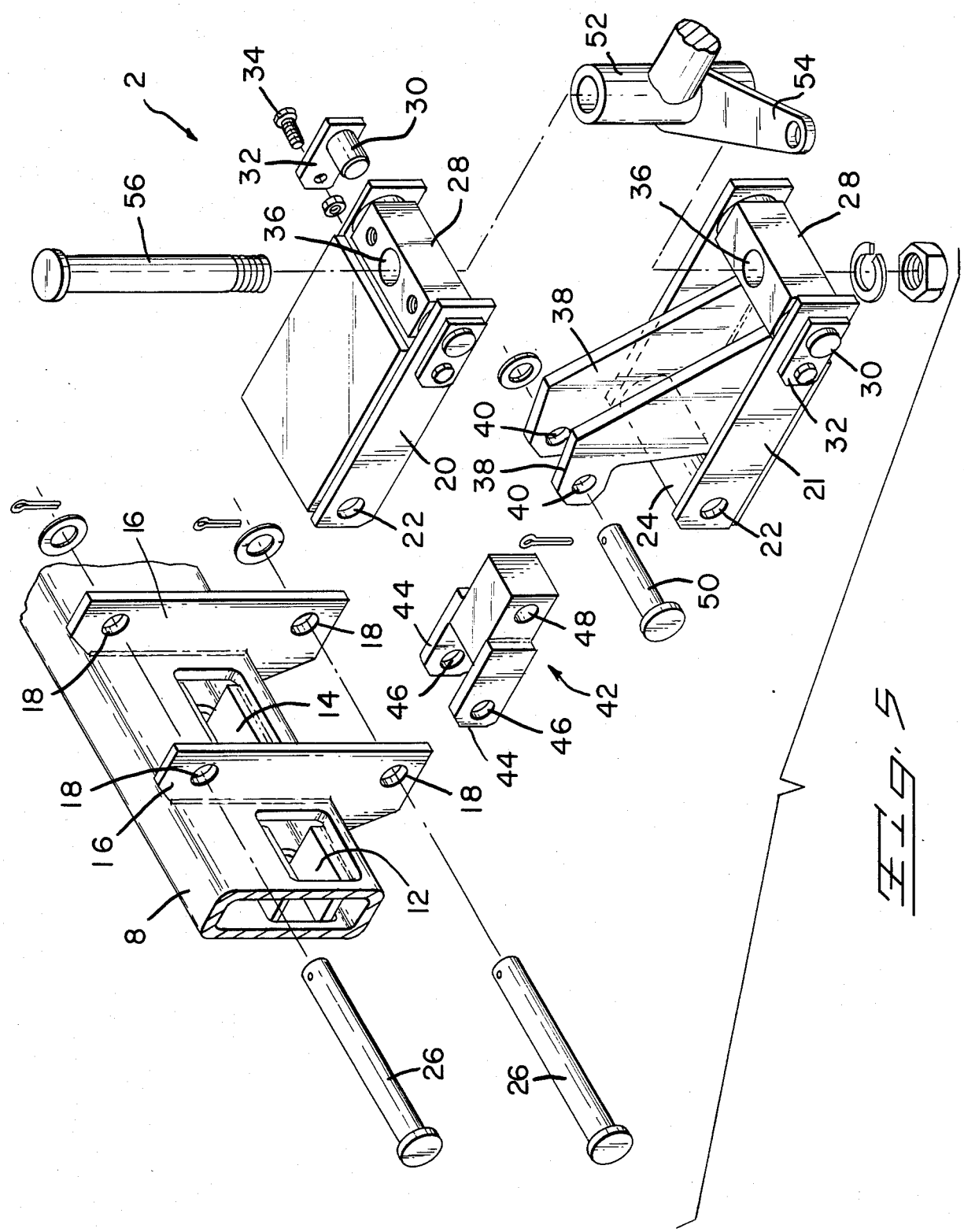

VEHICLE SUSPENSION AND STEERAGE SYSTEM

BACKGROUND OF THE INVENTION

1. Field of the Invention

The present invention relates generally to suspension systems for wheel supported vehicles, and more particularly to suspension systems for vehicles such as man-carrying mobile work platforms (where it is desirable to maintain the plane of the work platform as level as possible for the safety and comfort of the passengers).

2. The Prior Art

Axle suspension systems for wheel supported vehicles may be categorized as being of either the solid or oscillating tape. Solid transverse axles are frequently employed since such axles are less complicated structurally, and generally less expensive to manufacture. When steering is required, typically, a power assist motor is added to assist the steering function.

The primary disadvantage of such configurations is that a solid axle suspension results in a rigid ride and the main frame of the vehicle is subject to tilt whenever rough terrain is traversed, making the work surface of the vehicle uncomfortable and unsafe to ride upon or work from. A second disadvantage is that, on uneven surfaces, the wheels can assume a non-perpendicular attitude with respect to ground due to the rigidity of their coupling, introducing stress into the wheel spindle and king pin connections and advancing the wear of these parts. Also, the center of gravity of mobile work platforms is relatively higher than that of other vehicles, which increases their instability or uneven surfaces.

Attempts have been made to overcome the above deficiencies by making axles of a two-piece, oscillating construction, pivotal at the center. Theoretically, whenever a depression or incline is encountered by one side of the vehicle, the wheel on that side will pivot about the center of the axle, but the position of the opposite wheel will not be affected. Also, the main frame on that side will either raise or lower, while the opposite side will not react.

While the oscillating, center pivot, axle is an improvement over the solid axle, certain attendant shortcomings prevent it from representing an ideal solution to the industry's needs. First, the full effect of an irregularity in the road surface is transferred and made manifest on one side of the work platform or main frame, resulting in undesirable listing. Further, the wheels are susceptible to skewing from a vertical position whenever uneven terrain is encountered, as in the solid axle configurations. Moreover, present suspension systems utilize a dual cylinder lockout to prevent a vehicle from shifting laterally or forward whenever the unit is in a work position. Such a lockout requires a more complicated hydraulic system comprising two lock out cylinders, (one at each suspension arm), a transfer rod, hosing, etc., which is relatively expensive.

SUMMARY OF THE INVENTION

The above shortcomings in conventional suspension systems are overcome by the present invention which provides a suspension arm assembly of parallelogram configuration intended for pivotal attachment to a side of a vehicle main frame. The arm assembly supports a wheel which is free to vertically oscillate in response to terrain irregularities, and trunnion attachments are provided to maintain the wheel in a vertical orientation with respect to the ground surface. The piston rod of a hydraulic motor mechanically interconnects opposite wheels, and a lever structure is provided which, in response to pivotal oscillation of one wheel, axially activates the piston rod to transfer reactive forces to the opposite side of the main frame. These forces are applied to the opposite side of the main frame to tend to level the plane of the main frame, and keep the loads equal on both wheels. Further, the center of gravity of the machine main frame is lowered, and the overall height of the machine in the travel position is minimized, which increases stability. The hydraulic motor may be further hydraulically equalized to lock out further axial movement of the piston rod, which in turn locks out movement of the wheels, thereby stabilizing the vehicle in a static condition. A steerage arrangement is further provided for effecting rotation of the wheel spindles without interference with the operation of the above suspension system.

Accordingly, it is an object of the present invention to provide a suspension and steering system for a wheel supported vehicle, having means for averaging the listing effect that irregular ground terrain produces between both sides of the vehicle main frame so that a more nearly level frame platform is maintained.

A further object of the present invention is to provide a suspension and steerage system for wheel supported vehicle having means for averaging the affect of ground terrain irregularities between both sides of the vehicle main frame so that a level work surface is maintained, and further having means for steering the vehicle without interfering with, or being interfered by, said suspension means function.

Yet a further object of the present invention is to provide a suspension system for a wheel supported vehicle having means for averaging the affect of ground terrain irregularities, and further having singular means for locking out the wheels of said vehicle so that the vehicle is locked in a stable and static position.

Still further, it is an object of the present invention to provide a suspension system for a wheel supported vehicle featured having means for levelling the plane of the main frame of the vehicle when traversing rough terrain, and further having means for supporting a wheel spindle such that the wheel is maintained in perpendicular relationship with respect to the ground surface notwithstanding the irregularities of the terrain.

Another objective of the present invention is to provide compatible steering and suspension systems for a wheel supported vehicle, which systems may be economically and readily produced, and readily assembled.

These and other objects which will be apparent to one skilled in the art, are achieved by a preferred embodiment which is described in detail below, and which is illustrated by the accompanying drawings.

BRIEF DESCRIPTION OF THE ACCOMPANYING DRAWINGS

FIG. 1 is a top plan view of the steering and suspension systems configured pursuant to the present invention.

FIG. 2 is a cross-sectional view taken on the line 2—2 of FIG. 1 with parts broken away.

FIG. 3 is a diagramatic frontal view of the suspension system configured pursuant to the present invention, showing the vehicle suspension system on substantially level terrain.

FIG. 4 is a diagramatic frontal view of the suspension system configured pursuant to the present invention, as similarly depicted in FIG. 3, and showing the action of the suspension system in adapting to irregular ground terrain.

FIG. 5 is a three dimensional exploded perspective view of the right hand suspension arm assembly shown in FIGS. 1 and 2, exploded for the purpose of illustration.

DESCRIPTION OF THE PREFERRED EMBODIMENT

Figure 6:
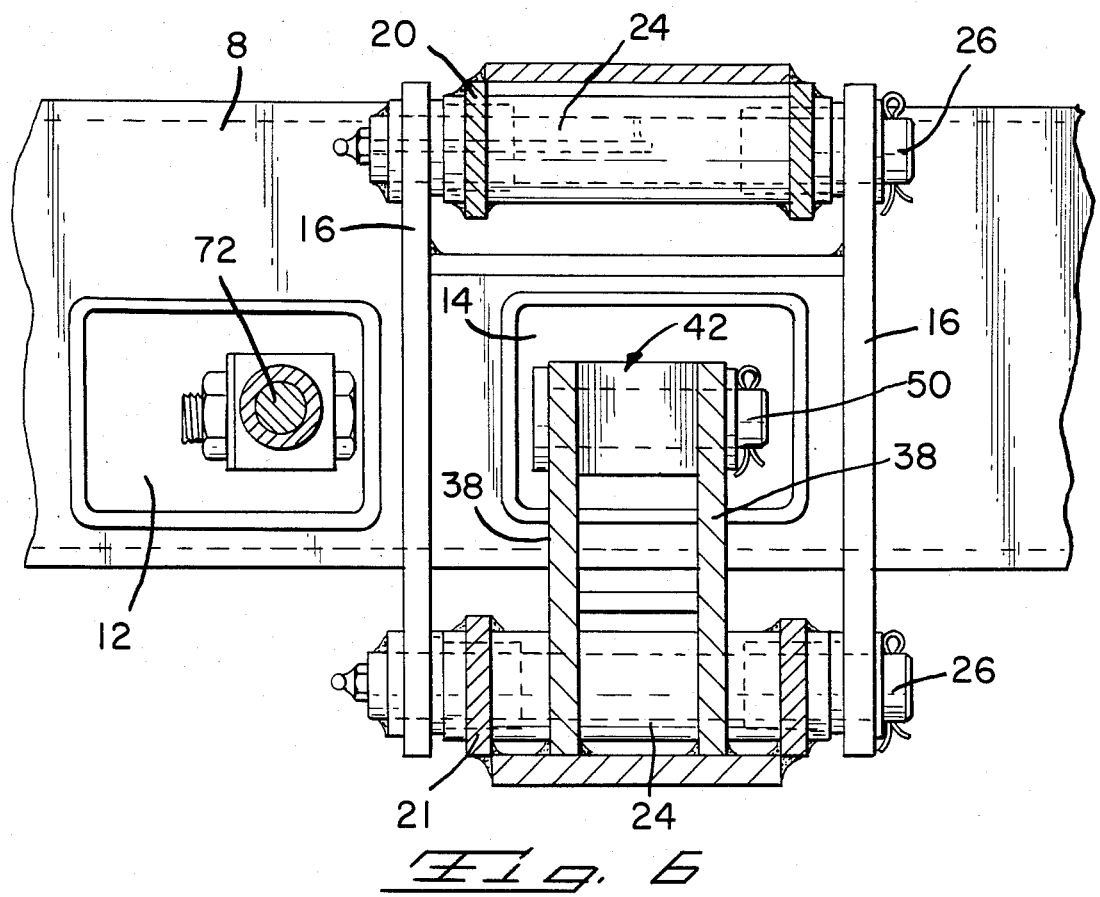
FIG. 6 is a cross-section of the suspension pivot arm assembly shown in FIG. 1, taken along the line 6—6.

The subject steering and suspension systems are illustrated in FIG. 1, and as shown are tandemly situated in transverse manner across the main frame of the vehicle chassis. In general, the subject invention comprises a wheel suspension arm assembly 2, a lockout/interconnect assembly or system 4, and a steering assembly 6, which are located in parallel relationship across a vehicle main frame 8. The vehicle main frame 8 is supported in part by a pair of oppositely disposed wheels 10.

The subject invention is suited generally for wheel supported vehicles, but particularly for conventional man-carrying mobile work platforms which are self-propelled, and which serve to transport workmen thereupon. Typically, such units are vertically extensible by a scissors linkage mechanism, or the like, and raise workmen to elevated work sites.

Referring to FIG. 5, the wheel suspension arm assembly 2 is shown in exploded fashion, and is structured as follows.

The vehicle main frame 8 is adapted having a pair of adjacent openings therethrough, one being the steerage opening 12, and the other being the suspension assembly opening 14. A pair of vertically extending arm attachment plates 16 are integrally welded to the main frame 8, one of the attachment plates 16 being interposed between the openings 12 and 14. The suspension arm assembly 2 comprises a pair of spaced apart and parallel upper suspension arms 20, and a like pair of spaced apart and parallel lower suspension arms 21, each of which having a mounting aperture 22 therethrough at an inward end. The pairs of upper and lower suspension arms are connected at the inner ends thereof end by a mounting bushing 24 of tubular configuration, which extends therebetween. It will be readily appreciated from FIG. 5 that the upper and lower suspension arms 20, 21 are intended to be attached to the attachment plates or brackets 16 of the main frame 8, by attachment pin 26. So attached, the upper and lower suspension arms are free to vertically pivot about their attachment points, and constitute generally a parallelogram configuration. As the suspension arms oscillate or pivot vertically, the upper and lower arms remain parallel to one another, and move in unison as will be explained below.

At the forward end of the upper and lower suspension arms, a pair of trunnion blocks 28 are provided, each extending horizontally between a respective pair of suspension arms. Each trunnion block 28 is rotatably mounted between outer ends of the suspension arms by attachment to a pivot pin 30, which projects through the suspension arms and which comprises an integral projection of a plate 32. The plate 32 is attached to the adjacent suspension arm by a bolt and nut 34 which prevents the link from pivoting, and thereby maintains pin 30 as a stationary central axis about which the trunnion block 28 rotates. Each of the trunnion blocks 28 has a central bore 36 extending therethrough, with the central bore of the upper trunnion block aligning vertically with the central bore of the lower trunnion block.

A pair of clevis plates 38 are provided, each having generally a triangular shape, with the clevis plates 38 being in parallel relationship and each attached along on bottom side to a respective one of the lower suspension arms 21. The clevis plates 38 are fixedly attached to the suspension arms 21 by suitable and conventional methods such as welding, and constitute levers for detecting or instituting pivotal movement of the suspension arms. Each clevis plate 38 has an aperture 40 through an inward end, thereof, representing an attachment point. An attaching link 42 is shown to consist of a pair of horizontal and spaced apart fingers 44, each finger having a mounting aperture 46 therethrough at an inward end, and each joined to a block having a through bore 48 through the outer end thereof a pin 50 is provided for attachment of the link 42 to the clevis plates 38.

As shown by FIG. 5, the wheel spindle 52 is intended to be vertically mounted between the trunnion blocks 28, and a steerage lever 54 projects outward from the periphery of the wheel spindle 52. The steerage lever 54 is integrally joined to the wheel spindle and serves to effectuate rotational movement of the wheel spindle about a vertical axis to achieve the steerage function. It will be appreciated that the cylindrical wheel spindle 52 aligns between the trunnion block bores 36, and receives a king pin 56 therethrough. The wheel spindle 52 is free to rotate about the king pin 56, in the conventional manner. However, as the suspension arms 20, 21 vertically pivot about their pivot attachment point to the main frame, the wheel spindle 52 is maintained in a vertical orientation by pivoting operation of one trunnion blocks 28. It should be noted that as the wheel of the vehicle encounters rough terrain, the associated wheel spindle causes the suspension arms to vertically oscillate in unison, and the trunnion blocks 28 to rotate about the pivot pins 30. Resultingly, the wheel spindle 52 is preserved in a vertical relationship with respect to the varying terrain, which is the optimal condition.

Proceeding to FIG. 2, the attachment link 42 is connected to a solid cylindrical piston rod 58 by an adjustable link 60 which screws into the piston rod 58. A jam nut 62 is used to adjust the axial spacing between the piston rod 58 and the attachment link 42. A double-acting hydraulic lock out cylinder 64 is provided, through which the piston rod 58 extends, as shown best by FIG. 1, and is attached to the frame 8 of the vehicle by a pair of split clamps 66. The cylinder 64 has a pair of access ports 68, to which hydraulic fluid lines 69 are attached. The ports 6 of the lock out cylinder 64 are normally interconnected by fluid lines 69 such that fluid may freely flow back and forth between the right and left hand chambers of the cylinder 64, by axial movement of the piston rod 58. In FIG. 1, there is shown a double acting steering cylinder 70 having a positively acting piston rod 72 extending therethrough. The steering cylinder 70 and lock out cylinder 64 are mounted in a tandem and parallel relationship. At both ends of the piston rod 72, a tie rod 74 is connected by end fittings 76. The outer most end fitting 76 of the tie rods 74 is attached to the steering lever 54 of a corresponding wheel. It should be noted that, pursuant to the present invention, the tie rod 74 is pivotally connected to the steering piston rod 72 at a pivot point which is horizontally spaced from the pivot points of the suspension arm assembly 2. This enables the tie rod 74 and the suspension arms 20, 21 each pivot vertically without binding or interfering with the function or operation of the other. It will further be appreciated that the steering cylinder 70 is hydraulically actuated to axially move the steering rod 72 in either direction to pivot the steering levers 54, thereby causing the wheel spindles to rotate in a conventional manner.

As shown in FIG. 2, the suspension arms of the right side of the vehicle, designated by unprimed numerals, are mechanically coupled with the suspension arms and structure of the left side of the vehicle, designated by like but prime notated numerals. The mechanical coupling is by the solid piston rod 58. As the suspension arms 20, 21 pivot vertically about the right side of the main frame, the clevis plates 38 move the piston rod 58 in or out depending upon the direction of the pivot oscillation. The piston rod 58 correspondingly forces the driven clevis plate 38' of the opposite or left side of the vehicle in a direction opposite to the movement of the driving clevis plate 38 on the right side. The movement of driven clevis plate 38' is transferred to the suspension arms 20', 21', coupled thereto, and tends to induce their equal pivotal movement in a direction opposite to the primary pivotal movement of right side suspension arms 20, 21. This operation will be better comprehended by reference to FIGS. 3 and 4.

As shown in FIG. 3, with the vehicle on level ground, the assembly arms 20, 21, 20', 21' are horizontal and parallel. It should be further noted that the wheel spindles 52, and 52' are vertical, with the tires 10 assuming an optimal perpendicular relationship with respect to ground.

As the vehicle encounters a protuberance, or incline, as shown in FIG. 4, the right side assembly arms 20, 21 are pivoted upward as the tire 10 rides over the incline. This upward pivotal movement forces the piston rod 58 to the left by operation of the clevis plate 38, which in turn forces the left side clevis plate 38' downward. The downward reactionary forces on left clevis plate 38' resultingly tends to pivot the left suspension arms 20', 21', downward, which in turn force the main frame 8' upward at the attachment point of suspension arms 20', 21' to the main frame. It will be noticed that the suspension arms 20, 21, 20' and 21', tend to retain a mutually parallel relationship in all conditions. Further, the upward listing of the right side of the vehicle main frame 8, caused by the incline, is to an extent counteracted by an upward movement of the opposite side of the main frame, 8' caused by the levered coupling. The result is that the plane of the main frame of the vehicle is maintained in as level or approximately level condition as possible, providing a more desirable and safe platform for the passenger or workman to operate from.

As stated above, the ports 68 of the lockout cylinder 64 are normally interconnected by fluid lines 69 so that hydraulic fluid is free to pass back and forth between left and right hand cylinder sides by operation of the piston rod 58. However, should the operator of the vehicle elect to lock out the related movement of the wheels, pursuant to the present invention, fluid may be directed into both sides of the cylinder 64 by actuation of a control valve 69A in conventional fashion, equalizing pressure on both sides of the piston rod 58, and disabling further movement of the linkage which connects the wheels 10 for the duration of the work period. Hydraulic lines 69 and valve 69A enable the operator to selectively permit or inhibit fluid flow between the left and right sides of the cylinder 64, and thus movement of the suspension arms. Thus, the operator can disable the linkage to place the work platform in a stable and static condition while it remains at a particular work location. This enhances safety in operation of the vehicle or work platform.

With further reference to FIG. 4, to the position of the wheels 10 relative to the ground remains perpendicular despite one wheel encountering the incline, due to the rotational operation of the trunnion blocks 28 and 28'. The trunnion blocks rotate to preserve the wheel spindles 52, 52' in a vertical orientation, and thereby maintain the optimal condition. Wear and stress on the spindle attachment components is thereby minimized and the useful life of these components is prolonged.

Some advantages of the present apparatus will be readily appreciated from a viewing of FIGS. 3 and 4. First, the suspension assembly serves to average the effect that ground terrain variations have on the tilt or list of the vehicle main frame. This averaging tends to maintain the passenger carrying work surface of the vehicle on a level plane, and enhances the safety of operation of the vehicle. Secondly, the single lock out cylinder 64 can be actuated to lock out relative movement of both the wheels, unlike present systems which use a separate cylinder for each wheel, thereby securing the vehicle in a stable and secure position. The wheel mounting system of the present invention, above described, results in a balanced and stable support for the weight of the vehicle and distributes the weight evenly on all wheels. The suspension system operates compatibly with the steering system and vice versa, in that neither system works to the detriment or interferes with the operation of the other.

Figure 7:
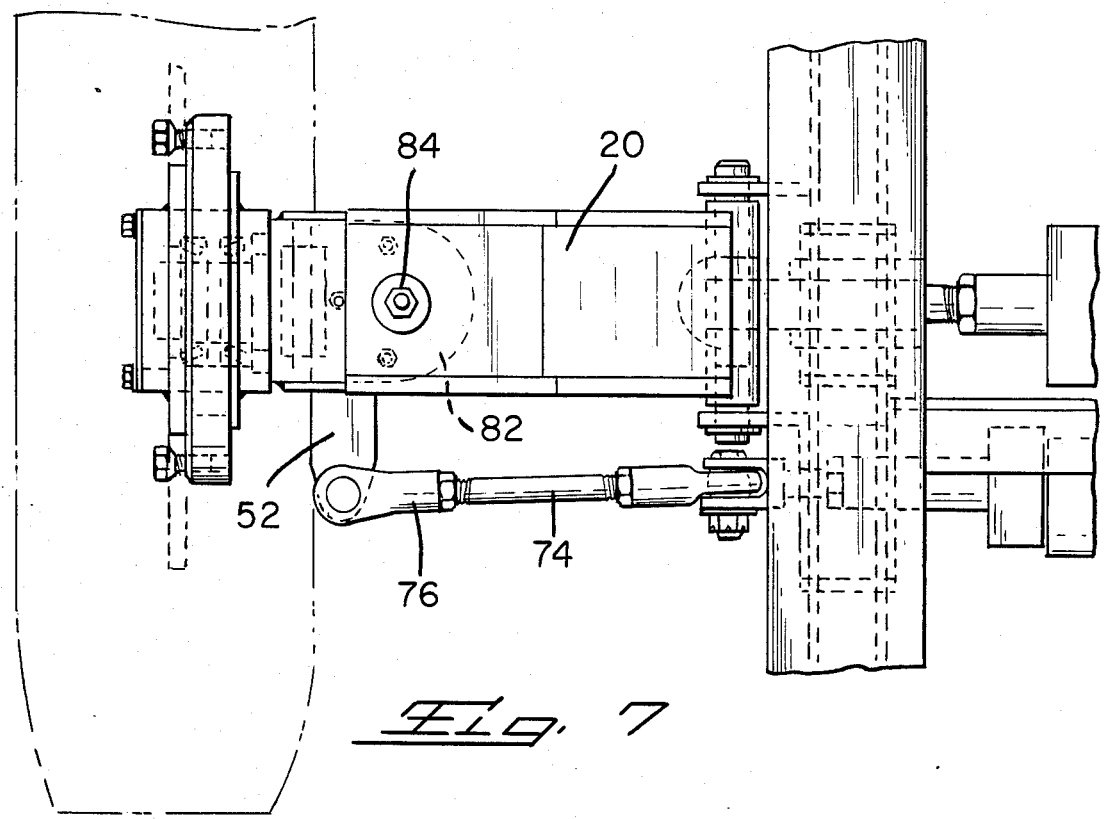
FIGS. 7 and 8 are respectively a top-planar view and a side elevational view of an alternative embodiment of the suspension arm assembly of the present invention.
Figure 8:
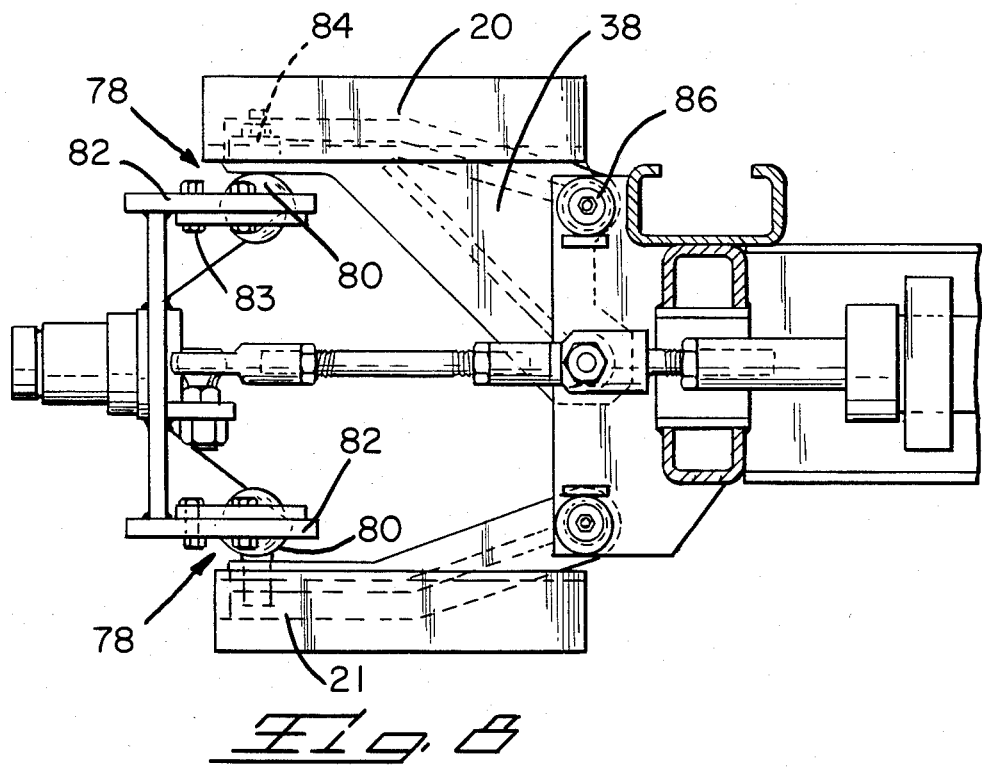

FIGS. 7 and 8 represent an alternative embodiment of the suspension arm assembly whereby the trunnion block arrangement 28 of the FIG. 1 is replaced by a ball joint assembly 78. As shown by FIG. 8, the assembly 78 comprises a pair of ball joints 80, each affixed to a wheel supporting plate 82 by a bolt and nut coupling 83. The ball joint 80 is of a commercial type, for example, as manufactured under Part JB 983 by Jamco Division of Dana Corporation.

The ball joint 80 is inserted through a horizontal plate 20, and coupled thereto by a nut fastener 84. Plate 20 functions in like manner as arms 20, or 21, of FIG. 1, and pivot about a pivot pin 86. A clevis plate 38 is welded to the plate 20, and reacts to pivotal movement of the plate and wheel by transmitting a reactionary force to the corresponding opposite wheel as described above. An end fitting 76 of tie rod 74 is attached to the steering lever 54 of the wheel as previously explained. It should be noted that clevis plate 38, and the equivalent plate on the opposite side of the chassis, (not shown) may be attached to the topmost horizontal plate 20, as shown by FIG. 8, rather than the bottom arm as depicted by FIG. 1. In either embodiment, the oscillatory movement of the horizontal members is detected by the clevis plate and transmitted to the opposite wheel.

While the above description is of a preferred embodiment, other embodiments which will become apparent to one skilled in the art upon consideration of the subject disclosure are intended to be within the scope and spirit of the present invention.

What is claimed is:

1. A vehicle having a frame, a pair of oppositely disposed, spaced, steerable wheels, a king pin for supporting each said wheel, and a suspension system connecting said frame and said wheels, said suspension system including means for supporting each said king pin with the axis thereof substantially vertical for pivotal movement about substantially horizontal axes adjacent said frame, said supporting means comprising upper and lower parallel suspension arms pivoted at their inner ends adjacent said frame, means for transmitting pivotal movement of one said upper and lower suspension arms to the other said upper and lower suspension arms and for causing said last mentioned arms to pivot a substantially equal amount and in the same rotary direction as said one upper and lower suspension arms, said movement transmitting means comprising a rod and means for connecting the ends of said rod to said suspension arms, means for rotating said wheels on said king pins, and means for selectively permitting or inhibiting pivotal movement of said suspension arms.

2. The structure of claim 1, said last mentioned means comprising lock out cylinder means.

3. The structure of claim 2, said lock out cylinder means comprising a cylinder, a piston, and said rod, said piston secured to said rod and being in said cylinder, and said rod extending axially through said cylinder.

* * * * *